Jan. 22, 1946. L. W. WACHTER 2,393,435
LOADER
Filed Nov. 24, 1944 2 Sheets-Sheet 2
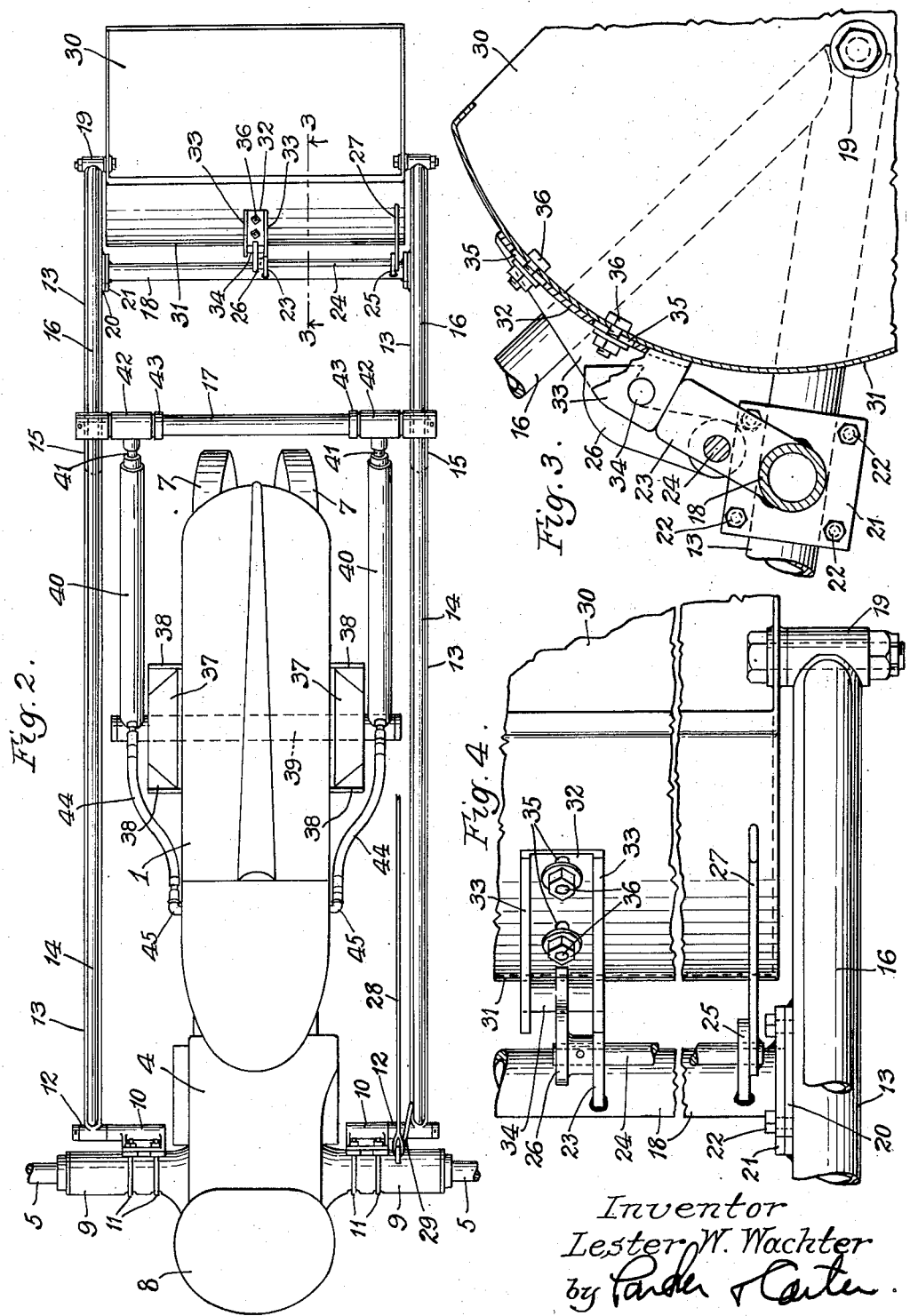
Inventor
Lester W. Wachter
by Parker & Carter
Attorneys.

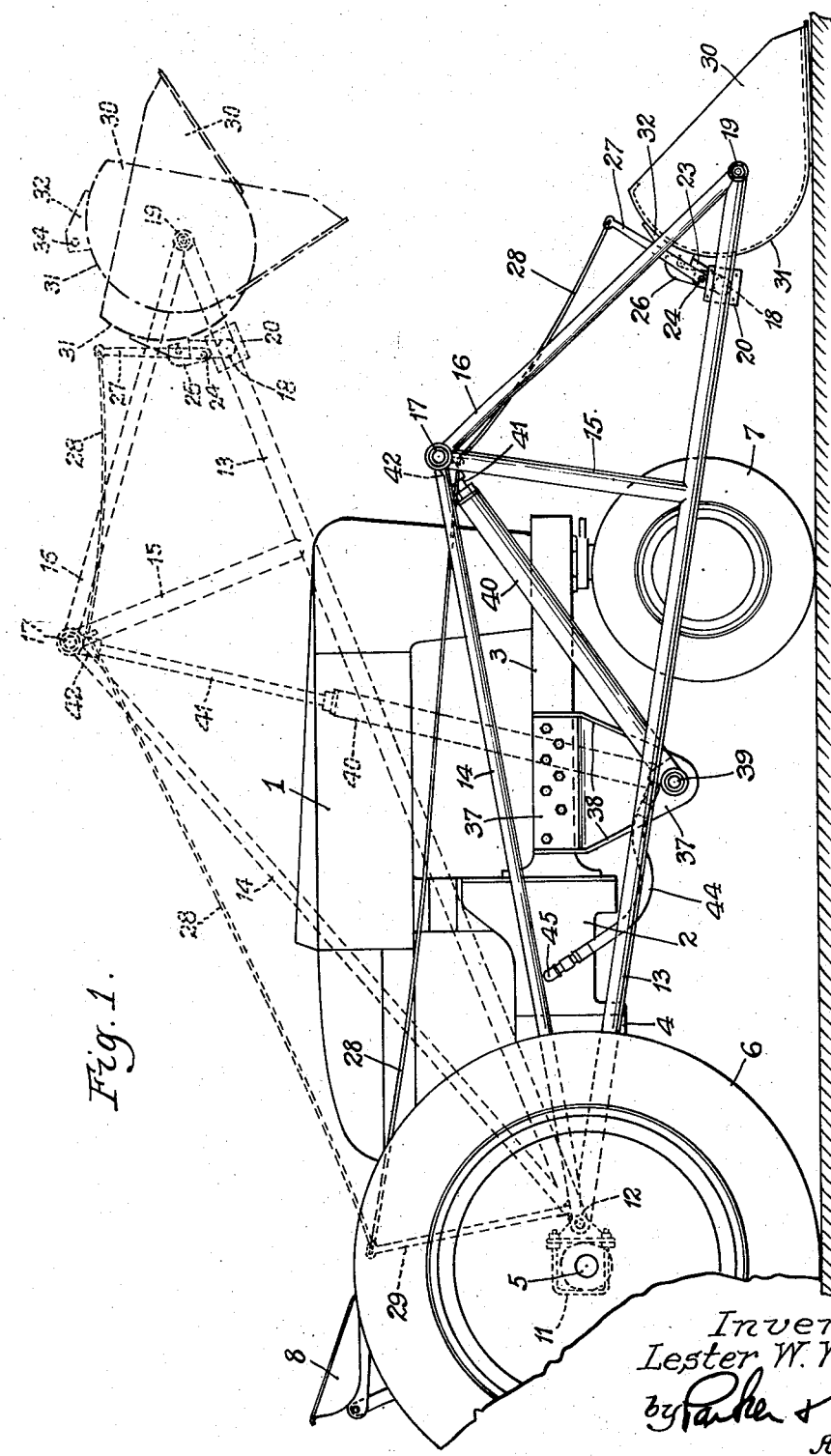

Patented Jan. 22, 1946

2,393,435

UNITED STATES PATENT OFFICE 2,393,435

LOADER

Lester W. Wachter, Streator, Ill., assignor to Anthony Company, Streator, Ill., a corporation of of Illinois Application November 24, 1944, Serial No. 564,953

7 Claims. (Cl. 214—140)

This invention relates to a loader and has for one object to provide a power operated loader which can be used on a vehicle.

Another object is to provide a power operated loader which can be readily mounted upon an automotive vehicle and which can be driven or operated from the engine of said vehicle.

Another object is to provide a simple hydraulic operated loading assembly which includes a bucket and hydraulic hoisting means and which may be readily mounted upon or demounted from an otherwise complete automotive vehicle.

Other objects will appear from time to time in the course of the specification and claims.

I illustrate my invention more or less diagrammatically in the accompanying drawings wherein:

Figure 1 is a side elevation of one form of the device mounted upon a tractor;

Figure 2 is a plan view of the construction shown in Figure 1;

Figure 3 is a vertical longitudinal section taken at line 3—3 of Figure 2, on an enlarged scale; and Figure 4 is a plan view of the details shown in Figure 3 with parts omitted and parts broken away.

Like parts are indicated by like symbols throughout the specification and drawings.

In the particular form shown the invention is mounted upon a tractor but it might be mounted on other vehicles. It is most conveniently mounted on a vehicle which is provided with an engine whether that engine be for propelling the vehicle or merely for operating the loader. The invention is not limited to any particular application and the device might be positioned upon any type of tractor, truck or automotive vehicle. The particular tractor shown herewith is merely illustrative of one possible construction and will be described only sufficiently to explain the mounting of the loader upon it.

As shown the tractor includes an engine, a frame, suitable wheels, axles and the like. An engine of suitable design is located under a hood or housing 1. A portion of the engine or transmission housing 2 is secured to a frame section 3 and forms with it and another housing section 4 the total frame of the vehicle. An axle 5 supports wheels 6 at the rear of the tractor and wheels 7 are positioned at the forward end of the vehicle. In the particular form here shown the tractor is in effect a three wheeled device with the two wheels 7 mounted close to each other in the manner now well known in the art. A seat 8 may be positioned on any suitable support at the rear of the tractor for an operator. The controlling, the transmission, the steering and the other necessary parts of a tractor or automotive vehicles is not illustrated as their details form no essential part of the present invention.

The axles 5 may in part be enclosed in housing members 9 upon which bearing supports 10 are secured by bolts 11 or otherwise. Mounted in the bearing supports 10 are short studs or shafts not shown upon which members 12 are mounted for rotation. Secured to each of the members 12 is a longitudinal frame member 13 and also secured to each of the members 12 is an inclined bracing frame member 14 which as shown particularly in Figure 1 diverges from the frame member 13 in a direction away from the bearing. Secured to the member 13 intermediate its ends and preferably closer to one end than the other is a member 15 to which the brace 14 is also secured. A fourth member 16 is secured at one end of the member 15 and at the other end to the forward portion or end of the member 13. As shown in Figure 1 the members 13, 14, 15 and 16 form in effect a truss which is pivoted at 12. Identical trusses are mounted one on each side of the assembly as shown in Figure 2 and the trusses are joined together at their apexes by a transverse member 17. They are also joined together adjacent their forward ends by a transverse member 18 which will be described below in greater detail. At their forward ends the members 13 and 16 are joined as at 19. While the transverse member 18 might be secured to the members 13 of the two trusses, it is convenient to arrange them so that the parts can be readily demounted for shipment. Hence plates 20 are welded or otherwise secured one to each of the members 13 and the transverse member 18 is welded or otherwise secured to plates 21. Corresponding plates 20 and 21 are secured thereto by bolts or screws 22, 22. It is to be understood that the invention is not limited to this particular detail of mounting to the transverse member 18. Fixed on the member 16 is a stop member 23. A latch operating shaft 24 is journaled adjacent one end in the stop 23 and adjacent the other end is a member 25 which is also fixed by welding or otherwise to the transverse member 18. Positioned on the shaft 24 is a latch 26. A latch operating arm or lever 27 is also fixed on the shaft 24 and is connected by means of a cable or rope 28 to an arm 29 which is itself secured to one of the side frame members 14.

Pivoted about the center 19 is a bucket 30 which as shown may have an open side and a curved or otherwise shaped closed rear portion 31. Adjustably positioned on the rear portion 31 is a bracket 32. As shown this bracket is provided with side portions 33 which may be of any desired shape and between which is mounted a member 34 suitable for engagement with the latch 26. The portion 32 is provided with slots 35 through which bolts 36 pass. The bolts also pass through the curved portion 31 of the bucket 30 and by means of the slot arrangement the bracket which carries the member 34 may be adjusted and secured in adjusted position upon the bucket and thus the position which the bucket will occupy when latched can be varied by this adjustment. By this means the bucket may be so adjusted so that its forward edge may be raised somewhat above the normal surface of the ground or projected somewhat below the normal surface of the ground. For some purposes it is desirable to have the bucket edge sufficiently above the ground to prevent its digging or even scraping too closely to the ground surface. For other purposes it may be desirable to position it so that it will either cut the ground surface very closely or even cut slightly below the ground surface. In the adjustment shown it permits either arrangement.

While the trusses may be raised by many sorts of mechanisms, it is convenient to do this by means of a hydraulic mechanism. For this purpose a pair of brackets 37 is mounted one on each side of the vehicle frame 3 and as shown the brackets may be riveted, bolted or otherwise fastened to the vehicle frame. They might, of course, be fastened to some other part of the total assembly. The brackets are provided with reinforcing flanges 38 and they furnish a support for a transverse member 39 upon each end of which there is mounted a hydraulic cylinder 40. A piston not shown is mounted in each cylinder and piston rods 41 extend from each cylinder and are secured to T members 42. These members may conveniently be mounted for rotation upon transverse truss connecting members 17 and are held in place by positioning stops 43 which are fixed upon the member 17.

A pressure fluid may be supplied to the cylinders by any suitable means. As shown a flexible conduit 44 is connected to each cylinder and is connected through a connection 45 to a pump which is positioned within the housing section 2. Many tractors are furnished today with pumps in their assembly, which pumps may be used for operating a variety of auxiliary hydraulic mechanisms. Where the device of the present invention is to be positioned upon a vehicle which has such a pump, the hydraulic cylinder and piston assemblies may conveniently be operated by means of such a pump. If no pump is furnished with the vehicle, an added pump may be used and it may be driven by any means such as the power take-off from the engine. Neither the pump construction or the pump is illustrated in detail, as its details form no part of the present invention, and it is sufficient that means be provided for furnishing fluid under proper pressure to operate the hydraulic cylinder assemblies.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing. In particular, the invention is not limited to the use of a bucket or shovel member such as the member 30 and a fork, rack or any other device suitable for picking up and lifting any material might be used. A rack suitable for lifting hay or any other material could be mounted generally as the bucket 30 is mounted and would be latched and managed as the bucket is latched and managed. Any form of material-holding and picking up means is within the contemplation of this invention.

The use and operation of my invention are as follows:

The mechanism of the present invention is assembled on a vehicle and preferably on an automotive vehicle. It is convenient to mount the bearing supporting means 10 on the rear axle or some other sufficiently firm base toward the rear of the vehicle. The hydraulic cylinders are positioned on their brackets 37 which are secured to a suitable point on the vehicle or vehicle frame. If a pump furnishes a part of the vehicle then the hydraulic cylinders are connected to that pump. If no pump is furnished one must be added and it is mounted on any suitable part of the assembly and is driven from the engine of the truck or vehicle. For loading the structure formed of the two trusses connected to each other and suitably pivoted upon the vehicle is lowered to or near the full line position of Figure 1. The vehicle is then moved forward preferably by its own engine until the bucket has been filled. When the bucket has been filled the vehicle is generally backed away from the material which has been loaded. The bucket may be raised before the vehicle is backed away or after it has been backed away. When the bucket has been filled with material and raised to a position sufficiently above the ground or above the material which it is loading for convenient operation, the vehicle is then driven with its loaded bucket raised to a point where the material is to be discharged. When that is to be done the operator pulls the cable or rope 28 thus rotating the shaft 24 and moving the latch 26 out of engagement with the member 34, the bucket being overbalanced is then in position to dump by gravity. The raised position of the assembly is shown in dotted line in Figure 1. The dash position of the bucket shown in Figure 1 indicates the bucket still in the loaded position and the dot and dash position of the bucket in Figure 1 indicates it in the dump or emptied position. With the bucket dumped the vehicle may be moved to the point of loading and the assembly will be lowered toward the full line position of Figure 1. The bucket will contact the ground and will be moved to the latched position for future use.

In order that the latching mechanism shall operate satisfactory in any position of the loading assembly the member 29 to which one end of the latch operating cable is secured is mounted to move with the truss assembly and therefore it has no relative movement with respect to that assembly and with respect to the bucket.

I claim:

1. A loader assembly adapted to be mounted on an automotive vehicle having an engine and a frame, said loading assembly including a pair of truss members, a pair of bearing supports mounted directly on said vehicle, each of said trusses being pivotally mounted on one of said bearing supports, brackets secured to said vehicle frame, a transverse member in said brackets and extending outwardly beyond each bracket, a pair of hydraulic cylinders mounted on said transverse member, a piston in each cylinder, a piston rod extending outwardly from each piston and cylinder, a transverse member fixed to each of said trusses, a pair of connections movably positioned on said transverse member, said pistons being secured one to each of said movable connections means for supplying fluid under pressure to said cylinders and a bucket pivotally mounted on the free ends of said trusses, latch means for holding said bucket against relative movement with respect to said trusses and means for releasing said latch means to free the bucket for movement with relation to said trusses.

2. A loader assembly adapted to be mounted on an automotive vehicle having an axle, an engine, and a frame, said loading assembly including a pair of truss members, a pair of bearing supports adapted to be mounted on said vehicle axle, each of said trusses being pivotally mounted on one of said bearing supports, brackets secured to said vehicle frame, a transverse member in said brackets and extending outwardly beyond each bracket, a pair of hydraulic cylinders mounted on said transverse member, a piston in each cylinder, a piston rod extending outwardly from each piston and cylinder, a transverse member fixed to each of said trusses, a pair of connections movably positioned on said transverse member, said pistons being secured one to each of said movable connections means for supplying fluid under pressure to said cylinders and a bucket pivotally mounted on the free ends of said trusses, latch means for holding said bucket against relative movement with respect to said trusses and means for releasing said latch means to free the bucket for movement with relation to said trusses.

3. A loader assembly adapted to be mounted on an automotive vehicle having an engine and a frame, said loading assembly including a pair of truss members, a pair of bearing supports adapted to be mounted directly on said vehicle, each of said trusses being pivotally mounted on one of said bearing supports, a pair of brackets secured one to each side of said vehicle, a transverse member pivoted in said brackets and extending outwardly beyond each bracket, a pair of hydraulic cylinders mounted on said transverse member, a piston in each cylinder, a piston rod extending outwardly from each piston and cylinder, a second transverse member fixed to each of said trusses, a pair of connections movably positioned on said second transverse member, said pistons being secured one to each of said movable connections means for supplying fluid under pressure to said cylinders and a bucket pivotally mounted on the free ends of said trusses, latch means for holding said bucket against relative movement with respect to said trusses and means for releasing said latch means to free the bucket for movement with relation to said trusses.

4. A loader assembly adapted to be mounted on an automotive vehicle having an engine and a frame, said loading assembly including a pair of truss members, a pair of bearing supports adapted to be mounted directly on said vehicle, each of said trusses being pivotally mounted on one of said bearing supports, brackets secured to said vehicle, a transverse member in said brackets and extending outwardly beyond each bracket, a pair of hydraulic cylinders mounted on said transverse member, a piston in each cylinder, a piston rod extending outwardly from each piston and cylinder, a second transverse member fixed to each of said trusses, a pair of connections movably positioned on said second transverse member, said pistons being secured one to each of said movable connections means for supplying fluid under pressure simultaneously and equally to said cylinders and a bucket pivotally mounted on the free ends of said trusses, latch means for holding said bucket against relative movement with respect to said trusses and means for releasing said latch means to free the bucket for movement with relation to said trusses.

5. A loader assembly adapted to be removably mounted on an automotive vehicle having an axle, an engine, and a frame, said loading assembly including a pair of identical truss members, a pair of removable bearing supports adapted to be adjustably mounted on said vehicle axle, each of said trusses being pivotally mounted on one of said bearing supports, a pair of brackets secured one to each side said vehicle frame, a transverse member in said brackets and extending outwardly beyond each bracket, a pair of hydraulic cylinders mounted on said member, a piston in each cylinder, a piston rod extending outwardly from each piston and cylinder, a second transverse member fixed to each of said trusses, a pair of connections movably positioned on said transverse member, said pistons being secured one to each of said movable connections means for supplying fluid under pressure to said cylinders and a bucket pivotally mounted on the free ends of said trusses, latch means for holding said bucket against relative movement with respect to said trusses and means for releasing said latch means to free the bucket for movement with relation to said trusses.

6. In combination for mounting on a vehicle, a movable frame formed in part of a pair of identical trusses, a plurality of bearing supporting means mounted directly upon said vehicle, each of said trusses pivoted on one of said bearing supporting means, a pair of brackets positioned one on each side of said vehicle, a pair of hydraulic cylinders positioned one on each side of said vehicle, a piston in each cylinder, a transverse member connecting said trusses at a point separated from their ends, members positioned on said transverse member and connected one to each of said pistons, means for supplying pressure fluid to said cylinders, a bucket mounted for pivotal movement between the free ends of said trusses, latching means for holding said bucket against relative movement with respect to said trusses.

7. In combination for mounting on a vehicle, a movable frame formed in part of a pair of identical trusses, a plurality of bearing supporting means mounted directly upon said vehicle, each of said trusses pivoted on one of said bearing supporting means, a pair of brackets positioned one on each side of said vehicle, a pair of hydraulic cylinders positioned one on each side of said vehicle, a piston in each cylinder, a transverse member connecting said trusses at a point separated from their ends, members positioned on said transverse member and connected one to each of said pistons, means for supplying pressure fluid to said cylinders, a bucket mounted for pivotal movement between the free ends of said trusses, latching means for holding said bucket against relative movement with respect to said trusses, said latching means including a shaft, a latch thereon, an operating lever secured to said shaft, a member fixed with relation to one of said trusses and adapted to move with it, a flexible member connecting said last mentioned member to said lever, said flexible member being adapted to be moved to unlatch said bucket.

LESTER W. WACHTER.